Dec. 24, 1963 J. C. SINGLETON ETAL 3,115,332
STUD TENSIONER DRAWBAR CONNECTOR
Filed July 27, 1960
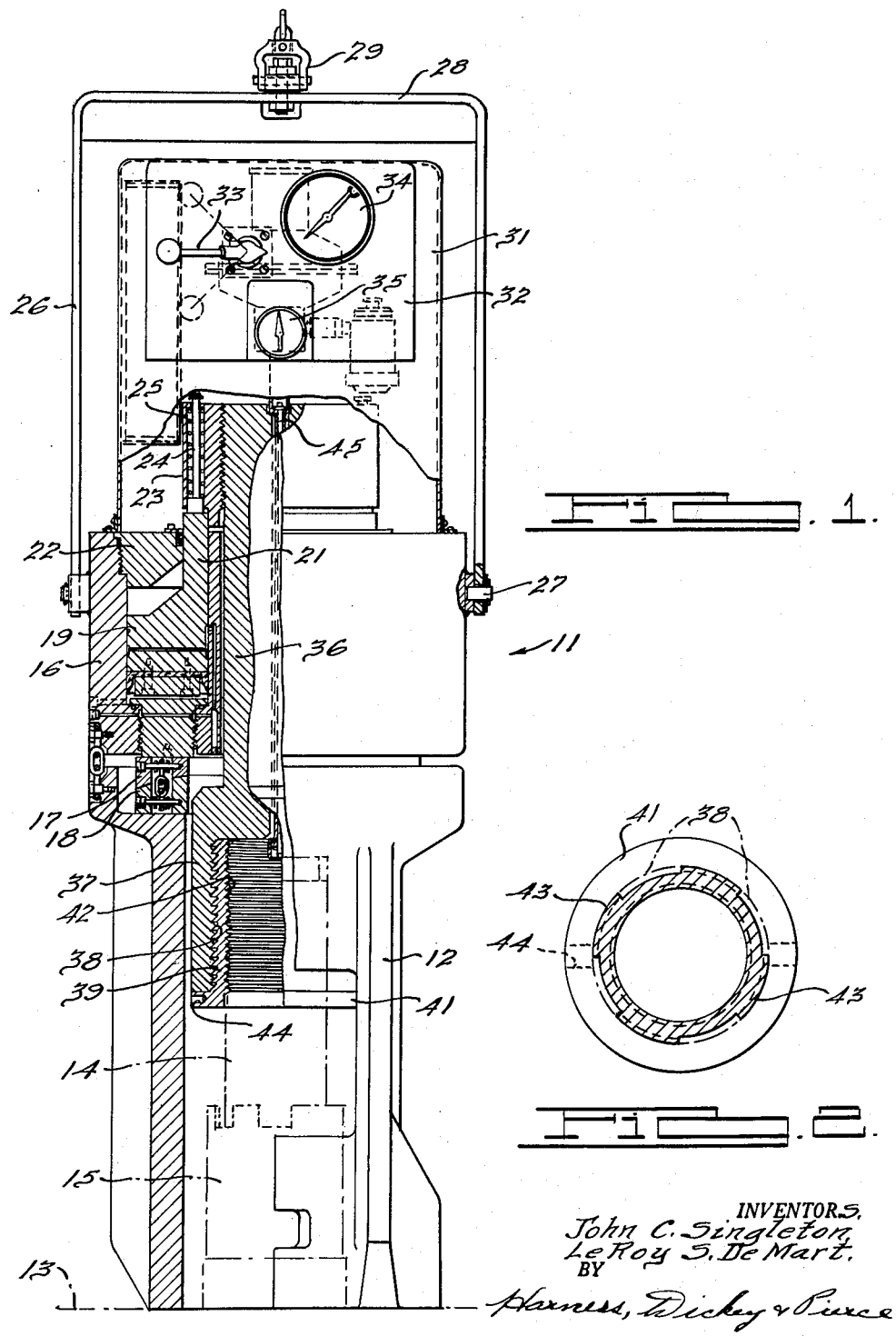
INVENTORS.
John C. Singleton,
LeRoy S. DeMart.
BY
Harness, Dickey & Pierce
ATTORNEYS.

United States Patent Office
3,115,332
Patented Dec. 24, 1963

3,115,332
STUD TENSIONER DRAWBAR CONNECTOR
John C. Singleton and Le Roy S. De Mart, Lancaster, Ohio, assignors to Diamond Power Specialty Corporation, Lancaster, Ohio, a corporation of Ohio
Filed July 27, 1960, Ser. No. 45,645
4 Claims. (Cl. 254—29)

This invention relates to stud tensioners, and more particularly to means for connecting and disconnecting such devices from studs.

The use of stud tensioners in elongating large diameter studs for the proper application of nuts thereto has created problems because of the heavy weight of such devices, especially when adapted for use with studs in large installations, such as reactor vessels. In connecting and disconnecting such unwieldy stud tensioners, the stud threads may often become galled or roughened due to undesired contact with the drawbar of the stud tensioner. Conventionally, this drawbar is internally threaded at its lower end and is lowered in place, the threads being then carefully engaged with the stud threads until a full connection is made.

It is an object of the present invention to provide a novel and improved connecting means between a stud tensioner drawbar and stud which minimizes the possibility of damage to the stud threads and facilitates quick and easy connection or removal of the drawbar.

It is another object to provide an improved stud tensioner-stud connecting means of this nature which will enable a stud tensioner unit to be used with various sizes of studs.

Other objects, features, and advantages of the present invention will become apparent from the subsequent description, taken in conjunction with the accompanying drawings.

In the drawings:
FIGURE 1 is a front elevational view, partly cross-sectioned, of a stud tensioner and stud embodying the novel principles of this invention; and
FIGURE 2 is a top plan view of the bronze sleeve showing its interrupted threads, with the interrupted threads of the drawbar being indicated in dot-dash lines.

In general terms, the invention comprises a stud tensioner having a pedestal adapted to engage a flange such as that of a reactor vessel having a plurality of relatively large diameter and heavy studs. These studs are to be temporarily elongated by tension when nuts are applied to them, the tension creating a predetermined elongation so that the studs will have proper loading when the nuts are applied and the tension released.

The pedestal supports a piston and cylinder, the piston in the illustrated embodiment of the invention acting upwardly against a thrust nut threaded on the upper end of a drawbar which extends downwardly through the piston and cylinder.

In accordance with the illustrated embodiment of the invention, a bronze bushing or sleeve is provided having a continuous internal thread and an interrupted or fluted external thread. The sleeve is mountable by hand on the stud to be tensioned, and the lower portion of the drawbar, which is widened, is provided with an interrupted or fluted internal thread. The drawbar may thus be lowered directly onto the stud, with its interrupted threads passing between those on the outside of the sleeve. When the drawbar and sleeve are in fully telescoped relation, a slight turn, illustrated as one-eighth of a turn, may be applied to the sleeve so that its interrupted threads will engage those of the drawbar. The stud and drawbar are thus interlocked for tensioning purposes.

Referring more particularly to the drawings, the stud tensioner is generally indicated at 11 and comprises a pedestal 12 adapted to engage a flange 13 of a reactor vessel or other installation, this flange carrying a plurality of studs indicated in dot-dash lines at 14. Studs 14 are externally threaded and are adapted to receive nuts 15, each nut 15 being tightened while its stud 14 is temporarily elongated by stud tensioner 11.

Pedestal 12 supports a cylinder 16 by means of a pair of spherical washer members 17 and 18, and an annular piston 19 is disposed within cylinder 16 and has an upward extension 21 passing through an upper member 22 threadably mounted in the cylinder. Subject matter disclosed but not claimed in this application pertaining to spherical washer members 17 and 18 is disclosed and claimed in later filed copending application Serial No. 103,017, filed April 14, 1961, and assigned to the assignee of the present application. A thrust nut 23 is supported by piston extension 21 through a plurality of circumferentially spaced pins 24 carried within the thrust nut and urged downwardly by springs 25. A frame 26 of inverted U-shape is pivotally connected at opposite ends 27 to the sides of cylinder 16, and the central portion 28 of frame 26 is adapted by means 29 to be suspended by a crane or similar appliance. A housing 31 mounted above cylinder 16 carries a control unit 32 for the stud tensioner with a control handle 33. A pressure gauge 34 and a strain gauge 35 for indicating stud elongation, may be carried by control unit 32.

A drawbar 36 is threadably mounted within thrust nut 23 at its upper end and extends downwardly through cylinder 16. The lower portion 37 of drawbar 36 is wider than the main portion of the drawbar and is disposed within the upper portion of pedestal 12, this pedestal comprising a plurality of spaced legs permitting access to its interior. An interrupted internal thread 38 is provided within drawbar portion 37. This interrupted thread may comprise four circumferentially spaced thread sections as seen in dot-dash lines in FIGURE 2, with axially extending spaces between these sections. The thread is preferably a buttress types so as to provide substantial strength when upward force is exerted on the drawbar.

A bushing or sleeve 39 is provided, this sleeve being preferably made of bronze or a similar metal and being provided with a shoulder or flange 41 at one end thereof. Sleeve 39 has a continuous internal thread 42 which is the same as the thread on stud 14, so that the sleeve may be threadably mounted on the stud as seen in FIGURE 1. An interrupted external thread 43 is provided on sleeve 39, this thread being seen in FIGURE 2. Thread 43 is shown as comprising four circumferentially spaced sections with axially extending lanes or channels therebetween. The relative sizes of threads 38 and 43, and their respective channels, are such that threads 38 may be received by the channels between threads 43 when the drawbar is lowered onto sleeve 39. Flange 41 is provided with a plurality of circumferentially spaced recesses 44 for the reception of a tool for rotating sleeve 39.

In operation, sleeve 39 will first be applied, for example manually, to stud 14, threads 42 of the sleeve engaging the stud threads until the sleeve is fully engaged on the stud as shown in FIGURE 1. Stud tensioner 11 may then be lowered into position over stud 14 with its drawbar 36 in its upper position. Thrust nut 23 may then be rotated, either manually or by motor means (not shown) with respect to drawbar 36, the drawbar thus being lowered directly onto sleeve 39. During this operation, the threads 38 and 43 of drawbar 36 and sleeve 39 respectively will be misaligned, so that threads 38 may enter into the recesses between threads 43. When the drawbar fully overlaps sleeve 39, the sleeve may be rotated one-eighth of a turn by inserting a tool into any hole 44, thus fully engaging threads 38 with threads 43. The stud tensioner may then be operated in the normal manner by applying pressure to piston 19 to tension the studs.

To disconnect the stud tensioner from the stud, the above-described operations may merely be reversed, sleeve 39 being rotated one-eighth of a turn until its threads 43 are out of alignment with threads 38, so that drawbar 36 may be withdrawn upwardly. The construction of this invention will not interfere in any way with other components of the stud tensioner, for example a rod 45 is used to operate strain gauge 35.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a stud tensioner having a centrally located drawbar extending therethrough, means on said stud tensioner surrounding said drawbar for exerting upward force on said drawbar, a lower portion on said drawbar, an internal thread formed in said lower portion, a plurality of circumferentially spaced axially extending recesses formed in said threads, a sleeve adapted to be threaded on a stud, an external thread formed on said sleeve corresponding to the internal drawbar thread, and a plurality of circumferentially spaced axially extending recesses formed in said external sleeve thread adapted to receive the internal drawbar thread, whereby rotation of said sleeve on said stud when said sleeve and drawbar are in telescoped relation will cause interlocking of said drawbar and sleeve.

2. The combination according to claim 1, the lower portion of said sleeve being provided with an outwardly extending flange, and means formed in said flange for receiving a tool, whereby said sleeve may be rotated.

3. The combination according to claim 1, said sleeve being fabricated of bronze, the interfitting threads on said sleeve and drawbar being of a buttress type, the radial surfaces on the sleeve threads facing downwardly.

4. In combination, a stud tensioner having a drawbar, means surrounding said drawbar for exerting upward force on said drawbar, an enlarged lower portion formed on the drawbar, an internal buttress type thread in said enlarged portion, the radial surfaces on said thread facing upwardly, a plurality of circumferentially spaced paths cut through said threads, a bronze sleeve having an internal thread adapted to be threaded onto a stud, an external buttress type thread on said sleeve matching said drawbar thread, circumferentially spaced paths cut away in said external sleeve thread adapted to receive the drawbar thread portions, and tool receiving means on the lower portion of said sleeve for permitting rotation of said sleeve, whereby said buttress type threads may be interlocked when the sleeve and drawbar are in telescoped relation.

References Cited in the file of this patent

UNITED STATES PATENTS

| 1,556,890 | Zebold et al. | Oct. 13, 1925 |
| 1,654,009 | Merten | Dec. 27, 1927 |
| 2,665,104 | Myers | Jan. 5, 1954 |
| 2,760,393 | Stough | Aug. 28, 1956 |
| 2,819,529 | Beck | Jan. 14, 1958 |
| 3,015,975 | Biach | Jan. 9, 1962 |

FOREIGN PATENTS

| 1,006,760 | France | Jan. 30, 1952 |